United States Patent
Moriwaki et al.

[11] Patent Number: 5,995,180
[45] Date of Patent: Nov. 30, 1999

[54] LIQUID CRYSTAL DISPLAY DEVICE HAVING HIGH BRIGHTNESS AND HIGH CONTRAST

[75] Inventors: Hiroyuki Moriwaki, Nara; Kazuya Yoshimura, Kitakatsuragi-gun; Takeyuki Ashida, Nara, all of Japan

[73] Assignee: Sharp Kabushiki Kaisha, Osaka, Japan

[21] Appl. No.: 09/098,970

[22] Filed: Jun. 17, 1998

[30] Foreign Application Priority Data

Jul. 7, 1997 [JP] Japan ..................................... 9-181030

[51] Int. Cl.⁶ .................................................. G02F 1/1335
[52] U.S. Cl. ............................. 349/96; 349/113; 349/119
[58] Field of Search ............................. 349/96, 112, 113, 349/117, 119; 359/485, 488, 490, 494, 495

[56] References Cited

U.S. PATENT DOCUMENTS

| | | | |
|---|---|---|---|
| 5,422,756 | 6/1995 | Weber | 359/487 |
| 5,684,551 | 11/1997 | Nakamura et al. | 349/113 |
| 5,686,979 | 11/1997 | Weber et al. | 349/96 |
| 5,828,488 | 10/1998 | Ouderdik et al. | 359/495 |
| 5,899,551 | 5/1999 | Neijzen et al. | 349/96 |

FOREIGN PATENT DOCUMENTS

| | | |
|---|---|---|
| 1-133003 | 5/1989 | Japan . |
| 6-230362 | 8/1994 | Japan . |
| 8-271731 | 10/1996 | Japan . |
| 9-506837 | 7/1997 | Japan . |
| 9-506985 | 7/1997 | Japan . |
| 9-511844 | 11/1997 | Japan . |

Primary Examiner—Hung Xuan Dang
Assistant Examiner—Tai V. Duong
Attorney, Agent, or Firm—Nixon & Vanderhye, P.C.

[57] ABSTRACT

A liquid crystal display having high brightness and high contrast and being able to achieve a paper-white appearance is provided. The liquid crystal cell is interposed between a pair of polarizing plates. The upper polarizing plate separates an incident light into a reflected light and a transmitted light. A light which would be absorbed when the dichroic polarizing plate is used, is utilized as a reflected light, so that a high brightness can be obtained. The lower polarizing plate partly transmits incident light and absorbs the remaining part. A reflected light from the lower polarizing plate is removed, so that the possible occurrence of a reduction in contrast attributed to the phenomenon that the reflected light is reflected on the upper polarizing plate is prevented. The upper polarizing plate has a flat spectral characteristic with regard to the reflected light and the transmitted light, and a* value and b* value of which plate are each smaller than 1. Therefore, no coloring occurs in the reflected light and the transmitted light at the upper polarizing plate, so that the paper-white appearance can be easily achieved.

9 Claims, 7 Drawing Sheets

*Fig.8A* *Fig.8B*
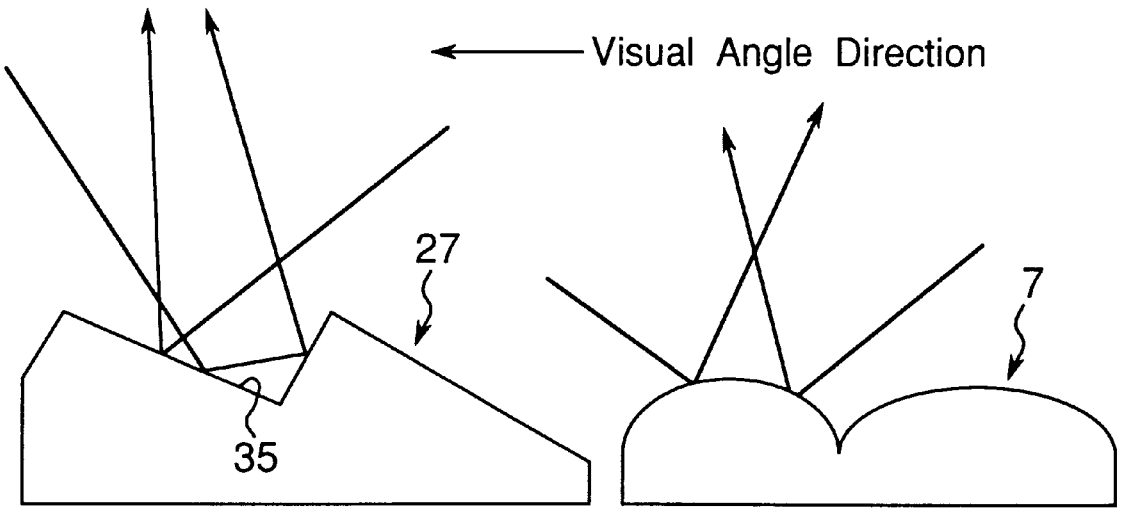
*Fig.9*
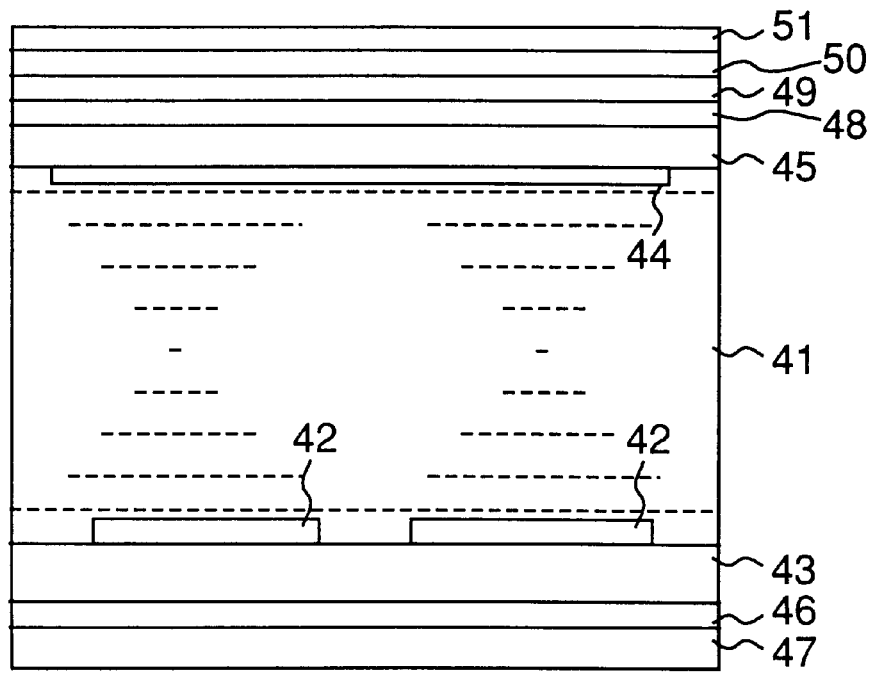

Fig. 10

| | Upper Polarizing Plate | Lower Polarizing Plate | Reflecting Plate | L* | a* | b* | Degree of Achromaticity $(a*^2+b*^2)^{1/2}$ | W* | Co |
|---|---|---|---|---|---|---|---|---|---|
| First Embodiment | DBEF | F1225DUN | Normal Silver | 58 | −9 | 6 | 11 | 57 | 6 |
| Second Embodiment | DBEF | F1225DUN | Directional Silver | 60 | −9 | 4 | 10 | 59 | 8 |
| Third Embodiment | Diffusing Plate +DBEF | F1225DUN | Directional Silver | 61 | −9 | 6 | 11 | 61 | 9 |
| First Comparison Sample | EG1225DU | F1225DUN | Normal Silver | 53 | −11 | 8 | 14 | 51 | 14 |
| Second Comparison Sample | DBEF | DBEF | Normal Silver | 62 | −2 | 0 | 2 | 62 | 3 |

LIQUID CRYSTAL DISPLAY DEVICE HAVING HIGH BRIGHTNESS AND HIGH CONTRAST

BACKGROUND OF THE INVENTION

The present invention relates to a liquid crystal display device utilizing a polarized light, and in particular, to a liquid crystal display device having high brightness and high contrast.

The liquid crystal element of the liquid crystal display device has a low consumption power because it is a non-luminous element for modulating external light. Furthermore, it can be applied to a flat display because of its thin thickness and light weight. Accordingly, taking advantage of the aforementioned merits, the liquid crystal element is used in a watch, a desk-top calculator, a computer terminal, a word processor, a television receiver or the like so as to be utilized as an information display device in a wide variety of fields.

The modern society is called the advanced information society, where an increasing amount of information is communicated and individuals have growing demands for collecting and selecting information. On such a social background, there have been an extensive recognition of a necessity for a personal use portable information terminal as well as an expectation for the implementation of it, along which the development of such a terminal has been positively pursued.

Lately, there is a demand for, in particular, a reflection type liquid crystal display device which has high brightness and high contrast and of which the background and the color of tone at the time of an off-state voltage are white like a paper and the black level at the time of an on-state voltage looks like a trace of a pencil tip on a quality paper.

However, according to the conventional transmission type, semi-transmission type and reflection type liquid crystal display devices, the incident light is made to outgo after passing through a polarizing plate at least two times as follows.

That is, the transmission type liquid crystal display device is generally constructed by arranging a liquid crystal element between a pair of polarizing plates. Then, incident light entering from one polarizing plate side is made to outgo through the other polarizing plate. The reflection type liquid crystal display device is constructed by laminating a polarizing plate, a liquid crystal element, a polarizing plate and a reflecting plate in the above-mentioned order. Then, incident light from the outermost polarizing plate is reflected on the reflecting plate and made to outgo through the outermost polarizing plate.

As both the polarizing plates that interpose the liquid crystal element between them, a macromolecular dichroic polarizing plate has been widely put into practical use. This polarizing plate transmits the incident light only in a specified direction of the polarizing plane and almost absorbs the remaining light. In this case, theoretically 50% of the incident light is lost, and this fact becomes the biggest problem in increasing the brightness of the LCD (Liquid Crystal Display) panel. Particularly, in the case of the reflection type liquid crystal display device, the incident light is made to outgo after passing through the polarizing plates four times, and therefore, the aforementioned problem becomes more serious. Furthermore, a shade is generated by a parallax due to a distance from the liquid crystal layer to the reflecting plate, consequently causing a significant reduction in visibility.

Accordingly, a variety of proposals for increasing the brightness by resolving the reduction in visibility due to the parallax of the reflection type liquid crystal display device have been made.

As a reflection type liquid crystal display device as described above, there is a one disclosed in, for example, the document of Japanese Patent Laid-Open Publication No. HEI 6-230362. This liquid crystal display device is a reflection type TN (Twisted Nematic) liquid crystal display device.

On one side of the liquid crystal element is arranged a polarizing plate. On the other side of the liquid crystal element are provided a quarter-wave plate, a cholesteric liquid crystal polymer film and an optical absorption plate in order from the liquid crystal element side while being arranged tightly close to one another. Then, an unnecessary light entering from the polarizing plate side is absorbed by the optical absorption plate, thereby making the light in a specified range of wavelength pass again and outgo through the polarizing plate. That is, by using the aforementioned quarter-wave plate and the cholesteric liquid crystal polymer film as the polarizing plate on the other side and using the optical absorption plate in place of the reflecting plate for the absorption of the unnecessary light, only the reflected light from the liquid crystal element becomes the outgoing light. Therefore, by virtue of the removal of the shade, the reduction in visibility is eliminated, and the brightness is increased by reducing the number of polarizing plates to one.

The document of Japanese Patent Laid-Open Publication No. HEI 1-133003 discloses a high-performance polarizing plate which prevents the absorption of light. This high-performance polarizing plate is formed by laminating the quarter-wave plate with a macromolecular liquid crystal layer comprised of a cholesteric phase.

However, the aforementioned prior art liquid crystal display device utilizing the cholesteric liquid crystal polymer film (Japanese Patent Laid-Open Publication No. HEI 6-230362), the cholesteric liquid crystal polymer film reflects only the light in the specified range of wavelength. Although the quarter-wave plate has an ability of converting light of a specified wavelength into a linearly polarized light, it is impossible to convert light in the whole visible wavelength region into the linearly polarized light. The above results in the problem that the outgoing light is disadvantageously colored, hindering the achievement of the paper-white appearance.

Also, in the case of the liquid crystal display device (Japanese Patent Laid-Open Publication No. HEI 1-133003) which uses the high-performance polarizing plate formed by laminating the quarter-wave plate with the macromolecular liquid crystal layer comprised of the cholesteric phase, the outgoing light is transmitted through the cholesteric liquid crystal and the quarter-wave plate similar to the aforementioned case, hindering the achievement of the paper-white appearance.

Therefore, in the liquid crystal display device disclosed in the document of Japanese Patent Laid-Open Publication No. HEI 8-271731, a multi-phase cholesteric film is laminated with a plurality of quarter-wave plates having different wavelengths of light to be converted into a linearly polarized light, thereby allowing the light in the whole visible wavelength region to be converted into the linearly polarized light. However, this liquid crystal display device has a problem that the transmittance is reduced due to the multiplicity of the layers to be laminated.

SUMMARY OF THE INVENTION

The object of the present invention is therefore to provide a liquid crystal display device which has high brightness and high contrast and is able to achieve a paper-white appearance.

In order to achieve the above object, there is provided a liquid crystal display device having a liquid crystal layer and a pair of polarizing layers between which the liquid crystal layer is interposed, wherein one polarizing layer of the pair of polarizing layers, located on an observer side, is a polarizing layer which separates an incident light into a reflected light and a transmitted light, and the other polarizing layer of the pair of polarizing layers is a polarizing layer which transmits part of the incident light and absorbs the remaining part.

According to the above construction, the light incident on the one polarizing layer of the pair of polarizing layers between which the liquid crystal layer is interposed, the one polarizing layer located on the observer side, is separated into a reflected light and a transmitted light. Thus, the light, which would be absorbed when the dichroic polarizing plate is used, is utilized as a reflected light, so that a high brightness can be obtained.

Furthermore, the light incident on the other polarizing layer located on the side opposite to the observer side is partially transmitted, and the remaining part is absorbed. As a result, the reflected light from the other polarizing layer is removed, so that the possible occurrence of a reduction in contrast attributed to the phenomenon that the reflected light coming from the other polarizing layer is reflected on the one polarizing layer is prevented.

In an embodiment of the present invention, the one polarizing layer is a polarizing layer on which the reflected light has a roughly flat spectral characteristic.

According to the above construction, the reflected light coming from the one polarizing layer has a roughly flat spectral characteristic. Therefore, the reflected light coming from the one polarizing layer is not colored.

In an embodiment of the present invention, the one polarizing layer is a polarizing layer in which chromaticness indices a* and b* in a CIELAB space have values expressed by a* #1 and b* #1 and the transmitted light has a roughly flat spectral characteristic.

According to the above construction, the one polarizing layer has an achromatic color, for which the light of a specified wavelength is not absorbed when the light is transmitted. Therefore, the light transmitted through the one polarizing layer is not colored.

In an embodiment of the present invention, the one polarizing layer separates the incident light into a linearly polarized reflected light and a linearly polarized transmitted light.

According to the above construction, the reflected light and the transmitted light coming from the one polarizing layer are each linearly polarized light, and accordingly, there is no need for the provision of a layer for linearly polarizing the reflected light and the transmitted light coming from the one polarizing layer. Therefore, the coloring phenomenon caused by the layer for linearly polarizing the reflected light and the transmitted light coming from the one polarizing layer is avoided.

In an embodiment of the present invention, the other polarizing layer is a dichroic polarizing plate.

According to the above construction, the other polarizing layer that transmits part of the incident light and absorbs the remaining part is easily constructed.

In an embodiment of the present invention, a light diffusing layer is laminated on the observer side of the one polarizing layer.

According to the above construction, a mirror reflection light on the one polarizing layer is diffused by the light diffusing layer, so that an image projection due to mirror reflection, i.e. specular surface reflection of the reflected light is prevented.

In an embodiment of the present invention, a light reflecting layer is provided on a side opposite to the observer side of the other polarizing layer.

According to the above construction, a high brightness is attempted by utilizing the absorbed light as a reflected light when the dichroic polarizing plate is used as the polarizing layer on the observer side, so that a reflection type liquid crystal display device or a semi-transmission type liquid crystal display device which prevents the possible occurrence of a reduction in contrast attributed to the reflected light coming from the polarizing layer on the side opposite to the observer side can be obtained.

In an embodiment of the present invention, the light reflecting layer has a directivity in a direction in which light is reflected.

According to the above construction, light coming from a wide range in the direction of visual angle is reflected in a specified direction by the light reflecting layer. Thus, the light coming from the wide range in the direction of visual angle is collected, so that the brightness is further increased.

In an embodiment of the present invention, the one polarizing layer has no right-side up with regard to a transmitted light characteristic and a reflected light characteristic.

According to the above construction, the one polarizing layer has no right-side up with regard to the transmitted light characteristic and the reflected light characteristic. Therefore, no change occurs with regard to the transmitted light characteristic and the reflected light characteristic even when the one polarizing layer is inadvertently made upside down when producing the present liquid crystal display device.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 8A and 8B are sectional views of reflecting plates of FIG. 7;

FIG. 9 is a sectional view of a reflection type monochrome liquid crystal display device different from the ones shown in FIG. 1 and FIG. 7;

FIG. 10 is a table showing the optical characteristics of the reflection type monochrome liquid crystal display devices and comparison samples.

DETAILED DESCRIPTION OF THE PREFERRED EMBODIMENTS

The present invention will be described in detail below based on the embodiments thereof with reference to the drawings.

First Embodiment

Figure 1:
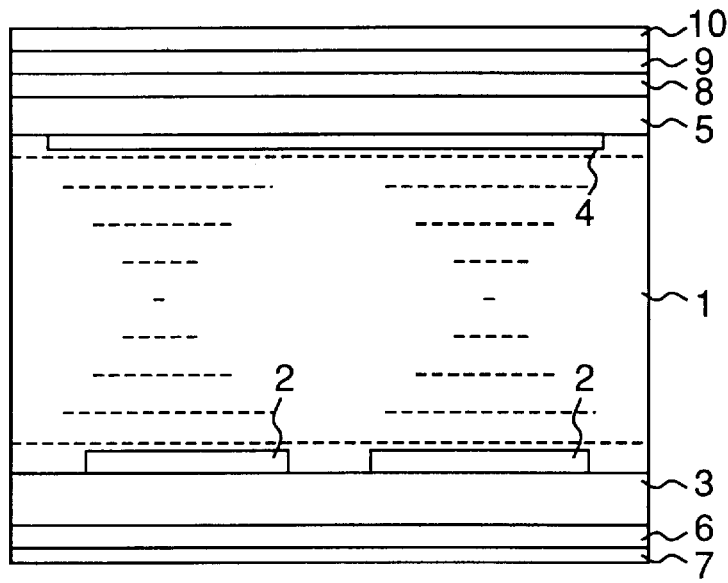
FIG. 1 is a sectional view of a reflection type monochrome liquid crystal display device according to the present invention.

FIG. 1 is a sectional view of a reflection type monochrome liquid crystal display device according to the present invention.

In FIG. 1, the reference numeral 1 denotes a liquid crystal cell which is interposed between a main substrate 3 on which an electrode 2 for driving the liquid crystals is formed and an opposite substrate 5 on which a transparent electrode 4 of ITO (Indium Tin Oxide) or the like is formed.

On the lower surface of the main substrate 3 is formed a lower polarizing plate 6 for polarizing incident light into an absorbed component and a transmitted component, while a reflecting plate 7 is formed on the lower surface of this lower polarizing plate 6. In this case, the liquid crystal cell 1 is a generic STN (Super-Twisted Nematic) type liquid crystal cell, while the reflecting plate 7 is a generic diffusive silver reflecting plate. As the lower polarizing plate 6 for polarizing incident light into an absorbed component and a transmitted component, in concrete, an iodine-based dichroic polarizing plate EG1225DU produced by NITTO DENKO CORP. was used. The liquid crystal cell 1 has a refractive index anisotropy An of 0.14 and a cell gap d of 6 μm, and the liquid crystal layer has a twist angle of 240 degrees.

On the upper surface of the opposite substrate 5 are arranged a lower phase difference plate 8 and an upper phase difference plate 9 in this order. On the upper surface of the upper phase difference plate 9 is formed an upper polarizing plate 10 for polarizing incident light into a reflected component and a transmitted component. As the upper polarizing plate 10 for polarizing incident light into a reflected component and a transmitted component, in concrete, a light guide plate film DBEF produced by Sumitomo 3M Co. was used. A retardation of the upper phase difference plate 9 and the lower phase difference plate 8 is 428 nm.

The aforementioned DBEF has no right-side up with regard to the transmitted light characteristic and the reflected light characteristic differently from the case of the polarizer which employs the conventional cholesteric liquid crystal polymer film and quarter-wave plate disclosed in the document of Japanese Patent Laid-Open Publication No. HEI 6-230362, and it can be used upside down as the dichroic polarizing plate. Therefore, in producing the present reflection type monochrome liquid crystal display device, the productivity can be improved without problem even when the upper polarizing plate 10 is erroneously set upside down.

Figure 2:
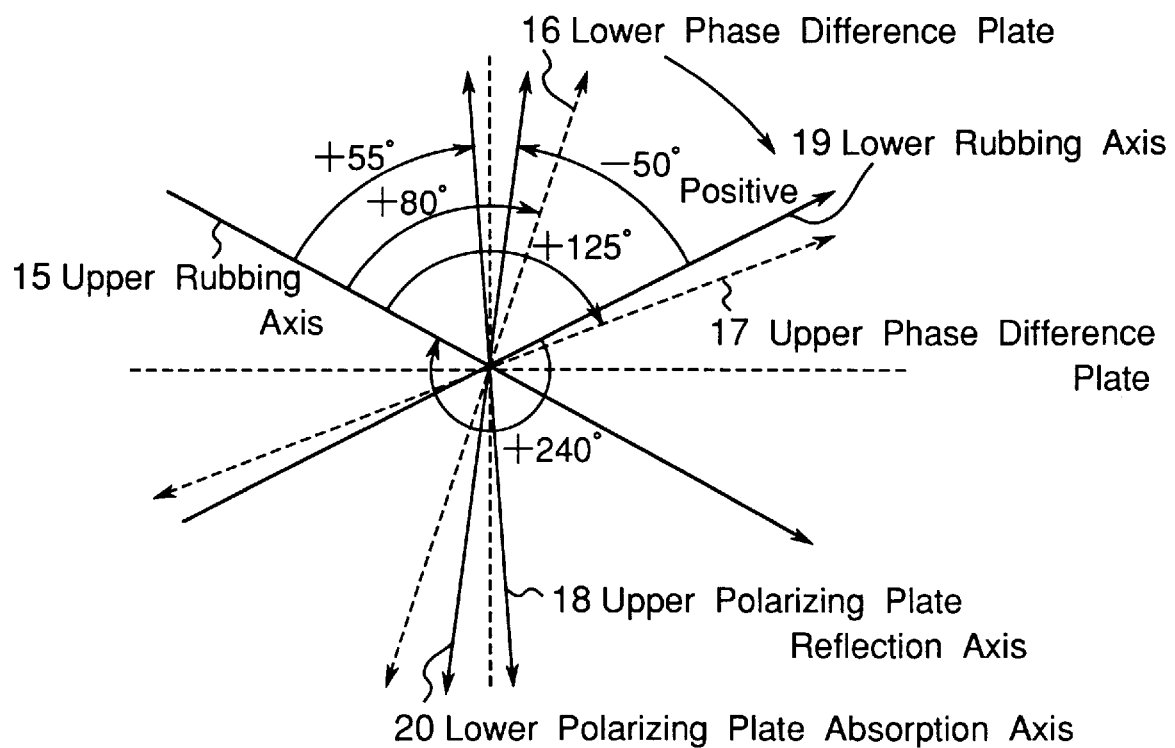
FIG. 2 is a view showing the directions of axes in FIG. 1.

FIG. 2 shows the directions of axes of the reflection type monochrome liquid crystal display device shown in FIG. 1. In FIG. 2, the clockwise angle viewed from the observer is assumed to be positive.

A crossing angle between an upper rubbing axis 15 and a lag axis 16 of the lower phase difference plate 8 is set to +80 degrees relative to the upper rubbing axis 15. A crossing angle between the upper rubbing axis 15 and a lag axis 17 of the upper phase difference plate 9 is set to +125 degrees relative to the upper rubbing axis 15. A crossing angle between the upper rubbing axis 15 and an upper polarizing plate reflection axis 18 is set to +55 degrees relative to the upper rubbing axis 15. A crossing angle between a lower rubbing axis 19 and a lower polarizing plate absorption axis 20 is set to −50 degrees relative to the lower rubbing axis 19. These crossing angles are mere examples, and they do not restrict the present invention.

In the reflection type monochrome liquid crystal display device having the construction shown in FIG. 1, the incident light is polarized to be separated into the reflected component and the transmitted component by the upper polarizing plate 10. Therefore, the light which has been absorbed in the conventional case where the macromolecular dichroic polarizing plate is used can be utilized as a reflected light, and therefore, the brightness can be improved.

The incident light is also polarized to be separated into the absorbed component and the transmitted component by the lower polarizing plate 6. Therefore, by virtue of the removal of the reflected light from the lower polarizing plate 6, the possible occurrence of a reduction in black level (i.e., a reduction in contrast) can be avoided as follows.

That is, when the liquid crystal layer is vertically interposed between the polarizing plates attended by a reflected light, the light reflected on the lower polarizing plate reaches the upper polarizing plate, and part of it is reflected on the upper polarizing plate. Then, part of the reflected light coming from the upper polarizing plate is re-reflected on the lower polarizing plate and the reflecting plate (in this case, the re-reflected component of light is the component that has been absorbed in the conventional case of the macromolecular dichroic polarizing plate). Subsequently, while being repetitively reflected on the upper and lower polarizing plates, the polarized state is disturbed, as a consequence of which the light of the component to be normally absorbed by the lower polarizing plate is transmitted through the upper polarizing plate, causing a reduction in black level. As a result, the contrast is reduced to degrade the visibility.

However, the lower polarizing plate 6 of the present embodiment separates and polarizes the incident light into the absorbed component and the transmitted component. Therefore, the re-reflection as described above does not occur, so that the possible occurrence of the reduction in black level can be avoided.

Figure 3:
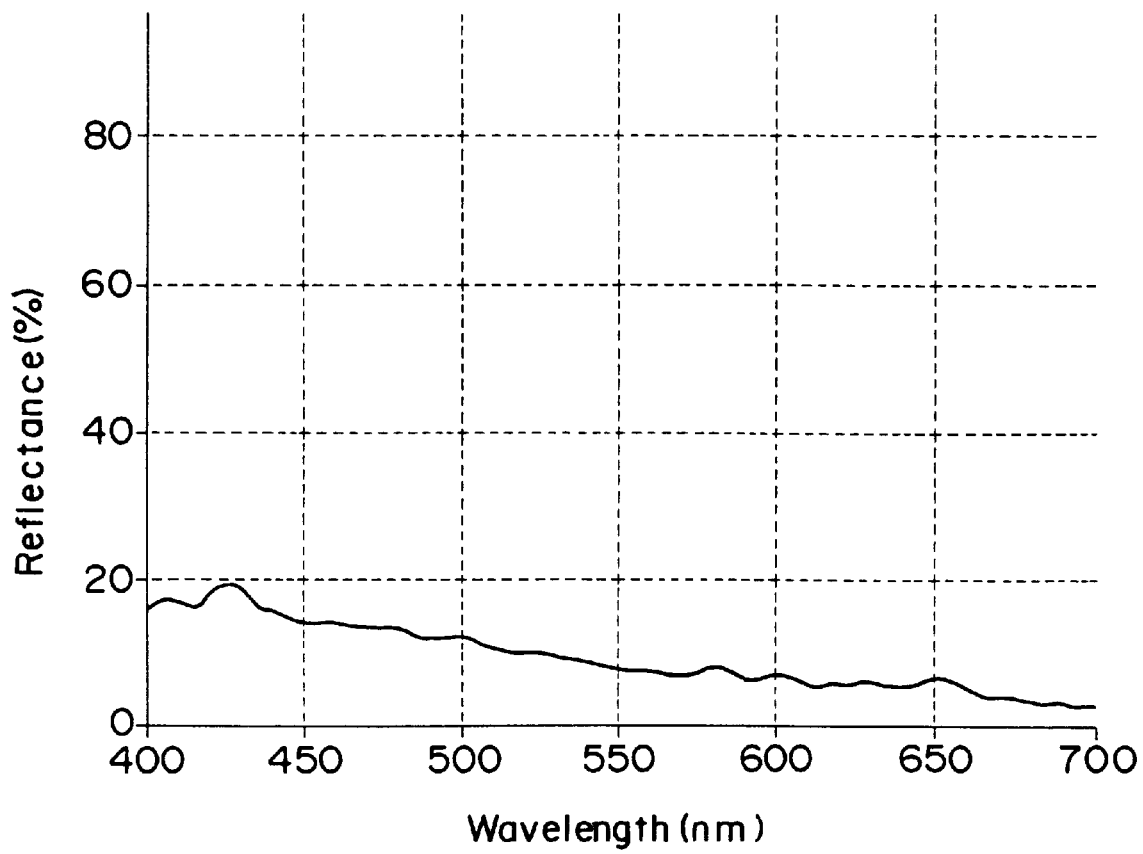
FIG. 3 is a graph of the spectral characteristic of reflectance of a light guide plate film.
Figure 4:
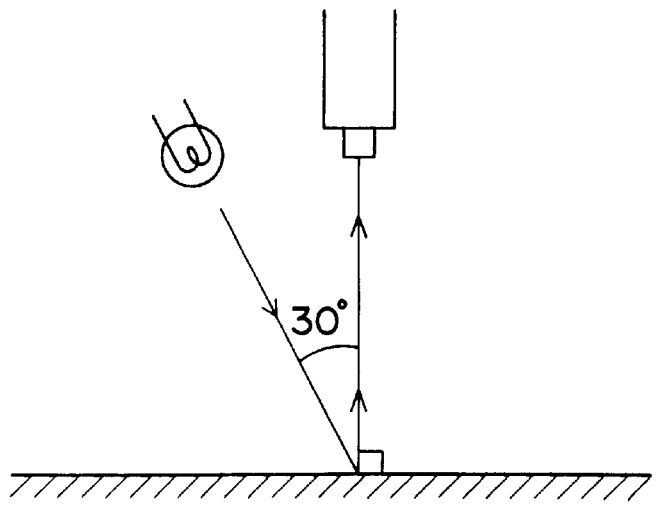
FIG. 4 is a view schematically showing a method for measuring the spectral characteristic shown in FIG. 3.

FIG. 3 shows the spectral characteristic of the reflectance of the light guide plate film DBEF produced by Sumitomo 3M Co. (referred to simply as DBEF hereinafter)and used as the upper polarizing plate 10. As shown in FIG. 4, this spectral characteristic of reflectance is the spectral characteristic of a reflected light in the direction of the normal line in the case where light is applied at a tilt angle of 30 degrees relative to the normal line of the DBEF. FIG. 3 shows the fact that the reflectance of the DBEF has a roughly flat spectral characteristic throughout the entire wavelength region.

As described above, the DBEF used as the upper polarizing plate 10 has a flat spectral characteristic with regard to the reflected light thereof. Therefore, no coloring occurs in the light reflected on the upper polarizing plate 10 of the present embodiment.

Figure 5:
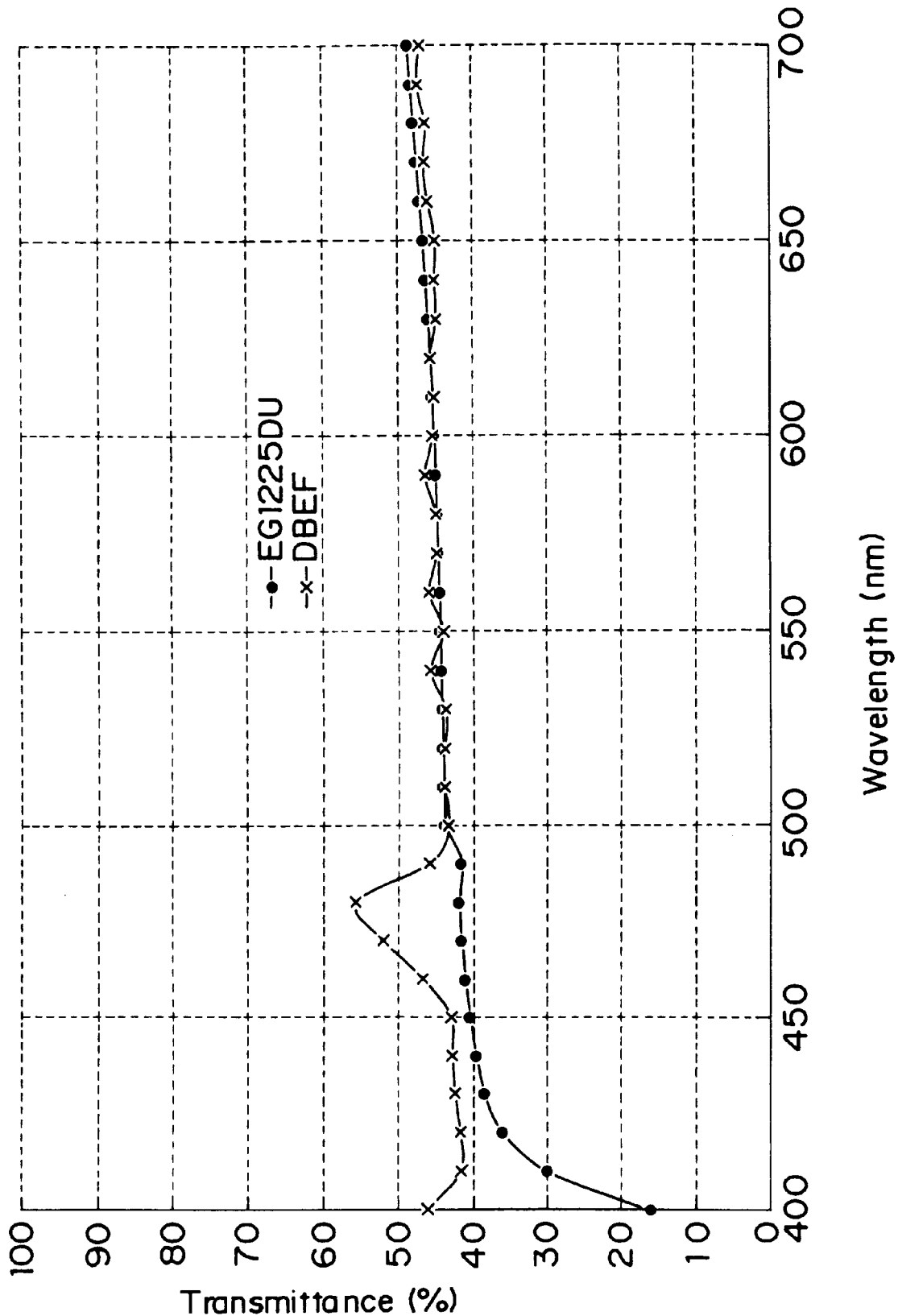
FIG. 5 is a graph of the spectral characteristics of transmittances of a iodine-based dichroic polarizing plate and the light guide plate film.

FIG. 5 shows the spectral characteristics of the transmittances of the iodine-based dichroic polarizing plate EG1225DU produced by NITTO DENKO CORP. (referred to simply as EG1225DU hereinafter) and used as the lower polarizing plate 6 and the DBEF used as the upper polarizing plate 10. FIG. 5 shows the fact that the transmittances of the EG1225DU and the DBEF have roughly flat spectral characteristics throughout the entire wavelength region.

Figure 6:
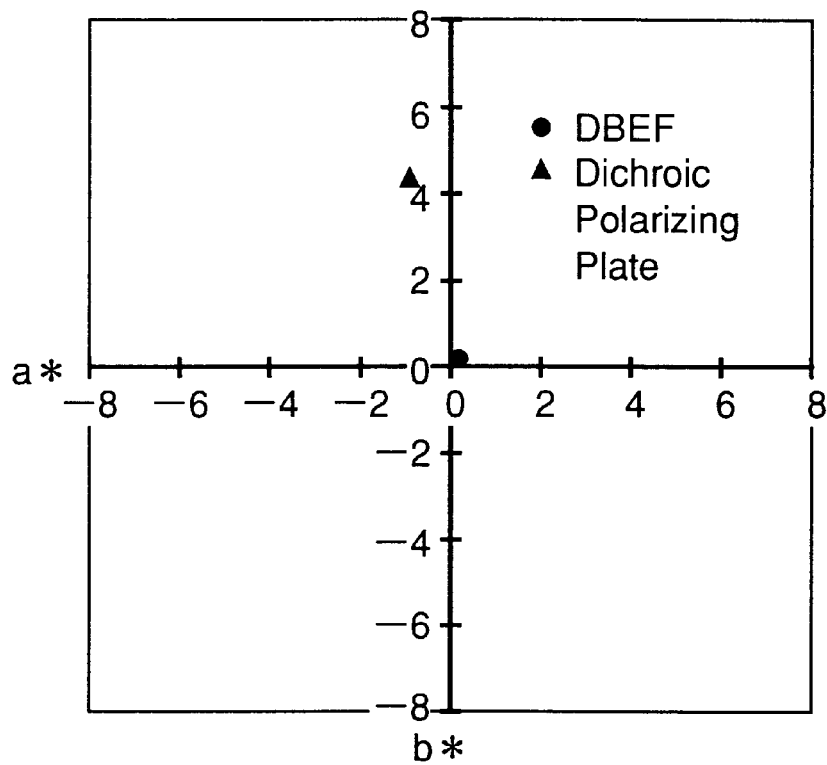
FIG. 6 is a graph showing the chroma of the light guide plate film.

FIG. 6 shows the chroma of the DBEF. The chroma was evaluated by means of a CIE(L*a*b*) color space.

It is to be noted that L*, a* and b* are uniform perception color space defined by the equations (1), (2) and (3) in CIE1976L*a*b* color system (JIS Z8729-(1980)).

$$L^* = 116(Y/Y_0)^{1/3} - 16 \quad (1)$$

$$a^* = 500\,[(X-X_0)^{1/3} - (Y-Y_0)^{1/3}] \quad (2)$$

$$b^* = 200\,[(Y-Y_0)^{1/3} - (Z-Z_0)^{1/3}] \quad (3)$$

In the above equations, $X_0$, $Y_0$ and $Z_0$ are the standard tristimulus values of light used for illumination, and X, Y and Z are the tristimulus values of the objective object. The psychometric lightness L* represents the brightness, and the chromaticness indices a* and b* represent the chroma.

As is apparent from FIG. 6, the chromaticness indices a* and b* of the DBEF are a* #1 and b* #1, respectively. The degree of achromaticity defined by $(a^{*2} + b^{*2})^{1/2}$ is 0.19. Therefore, synergically with the fact that the transmittance has the spectral characteristic of a flat transmittance as shown in FIG. 5, no coloring occurs in the transmitted light at the upper polarizing plate 10 of the present embodiment.

In contrast to this, the chromaticness indices a* and b* of the dichroic polarizing plate are a*=−1.06417 and b*=4.26534, meaning that a*<−1 and b*>1.

As described above, no coloring occurs in the light reflected on the upper polarizing plate 10 and the light transmitted through the upper polarizing plate 10 in the present embodiment. Therefore, the paper-white appearance can be easily achieved.

Furthermore, the DBEF used as the upper polarizing plate 10 can separate the incident light into the two linearly polarized light components of a linearly polarized reflected light and a linearly polarized transmitted light perpendicular to the polarizing direction of the reflected light.

As described above, the reflected light coming from the DBEF has already been a linearly polarized light, and therefore, the aforementioned quarter-wave plate for linearly polarizing the reflected light coming from the DBEF is not necessary in contrast to the polarizer that uses the conventional cholesteric liquid crystal polymer film disclosed in the document of Japanese Patent Laid-Open Publication No. HEI 6-230362. Therefore, the coloring phenomenon accompanying the use of the quarter-wave plate can be avoided.

The transmitted light coming from the DBEF is also a linearly polarized light, and its polarizing direction is perpendicular to the polarizing direction of the reflected light. This follows the relationship between the absorbed light and the transmitted light in the dichroic polarizing plate which has conventionally been often used as the polarizing plate, and the axial arrangement of the dichroic polarizing plate can be applied as it is to the axial arrangement of the upper polarizing plate 10. Accordingly, there is no need for renewing the design for the optical system in using the upper polarizing plate 10.

As described above, in the present embodiment, the upper polarizing plate 10 located on the observer side out of the pair of polarizing plates 6 and 10 that interpose the liquid crystal cell 1 between them is provided by the polarizing plate that polarizes the incident light into the reflected component and the transmitted component. With this arrangement, the light that would be absorbed when a macromolecular dichroic polarizing plate is used can be utilized as the reflected light, so that the brightness can be improved.

Furthermore, the lower polarizing plate 6 located on the side opposite to the observer side is provided by the polarizing plate that polarizes the incident light into the absorbed component and the transmitted component. With this arrangement, the reflected light from the lower polarizing plate 6 is removed, so that the reduction in black level, i.e., the reduction in contrast attributed to the fact that the reflected light from the lower polarizing plate 6 is reflected on the upper polarizing plate 10 can be suppressed.

As the upper polarizing plate 10, the achromatic polarizing plate which has flat spectral characteristics with regard to the reflected light and the transmitted light and in which the a* value and the b* value are each smaller than one is used. Therefore, no coloring occurs in the reflected light and the transmitted light at the upper polarizing plate 10, so that the paper-white appearance can be easily achieved.

The DBEF used as the upper polarizing plate 10 can separate the incident light into the two linearly polarized light components of the linearly polarized reflected light and the linearly polarized transmitted light perpendicular to the polarizing direction of the reflected light. Therefore, the aforementioned quarter-wave plate for converting the reflected light of the upper polarizing plate 10 into the linearly polarized light is not necessary, so that the coloring phenomenon accompanying the use of the quarter-wave plate can be avoided.

In the above case, the relationship between the polarizing direction of the reflected light and the polarizing direction of the transmitted light coming from the upper polarizing plate 10 is similar to the relationship between the absorbed light and the transmitted light at the dichroic polarizing plate. Accordingly, there is no need for renewing the design for the optical system in using the upper polarizing plate 10.

Second Embodiment

Figure 7:
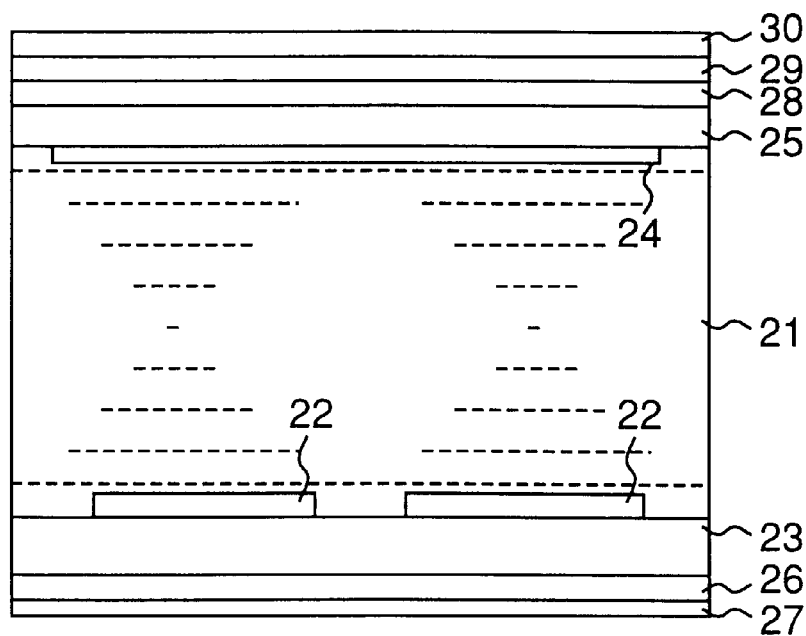
FIG. 7 is a sectional view of a reflection type monochrome liquid crystal display device different from the one shown in FIG. 1.

FIG. 7 is a sectional view of a reflection type monochrome liquid crystal display device of the present embodiment.

A liquid crystal cell 21, an electrode 22, a main substrate 23, a transparent electrode 24, an opposite substrate 25, a lower polarizing plate 26, a lower phase difference plate 28, an upper phase difference plate 29 and an upper polarizing plate 30 have constructions and functions similar to those of the liquid crystal cell 1, electrode 2, main substrate 3, transparent electrode 4, opposite substrate 5, lower polarizing plate 6, lower phase difference plate 8, upper phase difference plate 9 and upper polarizing plate 10 of the first embodiment.

A reflecting plate 27 in the present embodiment is a directional silver reflecting plate in contrast to the fact that the reflecting plate 7 of the first embodiment is the diffusive silver reflecting plate.

As shown in FIG. 8A, a sawtooth-shaped groove 35 having a width of several tens of micrometers to several hundreds of micrometers is formed on this directional silver reflecting plate 27. As described above, by using the reflecting plate having a directivity in the direction in which light is reflected, the mirror reflection is more intense than that of the diffusive silver reflecting plate 7 that has a sectional structure as shown in FIG. 8B and has no directivity in the direction of reflection, so that light coming from a direction that is high at angle when viewed from the normal line and is inferior in visual angle characteristic can be collected in the direction of the normal line. Therefore, the brightness can be further increased.

The sectional structure of the groove is not limited to the sawtooth shape. Furthermore, interference fringes may occur depending on the width of the groove, and therefore, it is required to reduce the width of the groove and shift a little the direction of the groove.

Third Embodiment

FIG. 9 is a sectional view of a reflection type monochrome liquid crystal display device of the present embodiment.

In FIG. 9, a liquid crystal cell 41, an electrode 42, a main substrate 43, a transparent electrode 44, an opposite substrate 45, a lower polarizing plate 46, a reflecting plate 47, a lower phase difference plate 48, an upper phase difference plate 49 and an upper polarizing plate 50 have constructions and functions similar to those of the liquid crystal cell 21, electrode 22, main substrate 23, transparent electrode 24, opposite substrate 25, lower polarizing plate 26, reflecting plate 27, lower phase difference plate 28, upper phase difference plate 29 and upper polarizing plate 30 of the second embodiment.

In the present embodiment, a light diffusing plate 51 is formed on the upper surface of the upper polarizing plate 50. As the light diffusing plate 51, in concrete, a diffusing plate AG30 produced by NITTO DENKO CORP. was used.

This light diffusing plate 51 diffuses the light reflected on the mirror surface, i.e. specular surface of the upper polarizing plate 50, thereby preventing the image projection due to the mirror surface reflection caused by the reflected light coming from the upper polarizing plate 50. Thus by preventing the image projection due to the mirror surface reflection, the brightness and the contrast can be improved.

The effect of preventing the image projection due to the mirror surface reflection caused by the reflected light coming from the upper polarizing plate 50 can be obtained by scattering the specularly reflected light. Therefore, as the light diffusing plate 51, the Lumisty produced by SUMITOMO CHEMICAL CO., LTD. which utilizes a refractive index difference between the phase structures of the macromolecular film or the like can also be used.

The optical characteristics of the reflection type monochrome liquid crystal display devices described in the first through third embodiments will be described next.

In this case, the optical characteristics of each of the reflection type monochrome liquid crystal display devices include the four factors of background brightness, chroma, black level and whiteness. The background brightness and chroma were evaluated by means of the CIE($L^*a^*b^*$) color space. The black level was evaluated by a contrast Co defined by (reflectance at the time of off-state voltage)/(reflectance at the time of on-state voltage). The whiteness was evaluated by $W^*$ defined by the equation (4).

$$W^* = 100 - [(100-L^*)^2 + a^{*2} + b^{*2}]^{1/2} \quad (4)$$

The following two comparison samples are added to the evaluation of the aforementioned optical characteristics.

(a) First comparison sample

A polarizing plate for polarizing incident light into an absorbed component and a transmitted component was used for each of a pair of the upper polarizing plate and the lower polarizing plate between which the liquid crystal cell is interposed. In detail, the aforementioned EG1225DU was used as the upper polarizing plate, while an iodine-based dichroic polarizing plate F1225DUN produced by NITTO DENKO CORP. was used as the lower polarizing plate. The reflecting plate is the normal diffusive silver reflecting plate.

(b) Second comparison sample

A polarizing plate for polarizing incident light into a reflected component and a transmitted component was used for each of a pair of the upper polarizing plate and the lower polarizing plate that interpose the liquid crystal cell between them. In detail, the aforementioned DBEF was used for both the polarizing plates. The reflecting plate is the normal diffusive silver reflecting plate.

Figure 11:
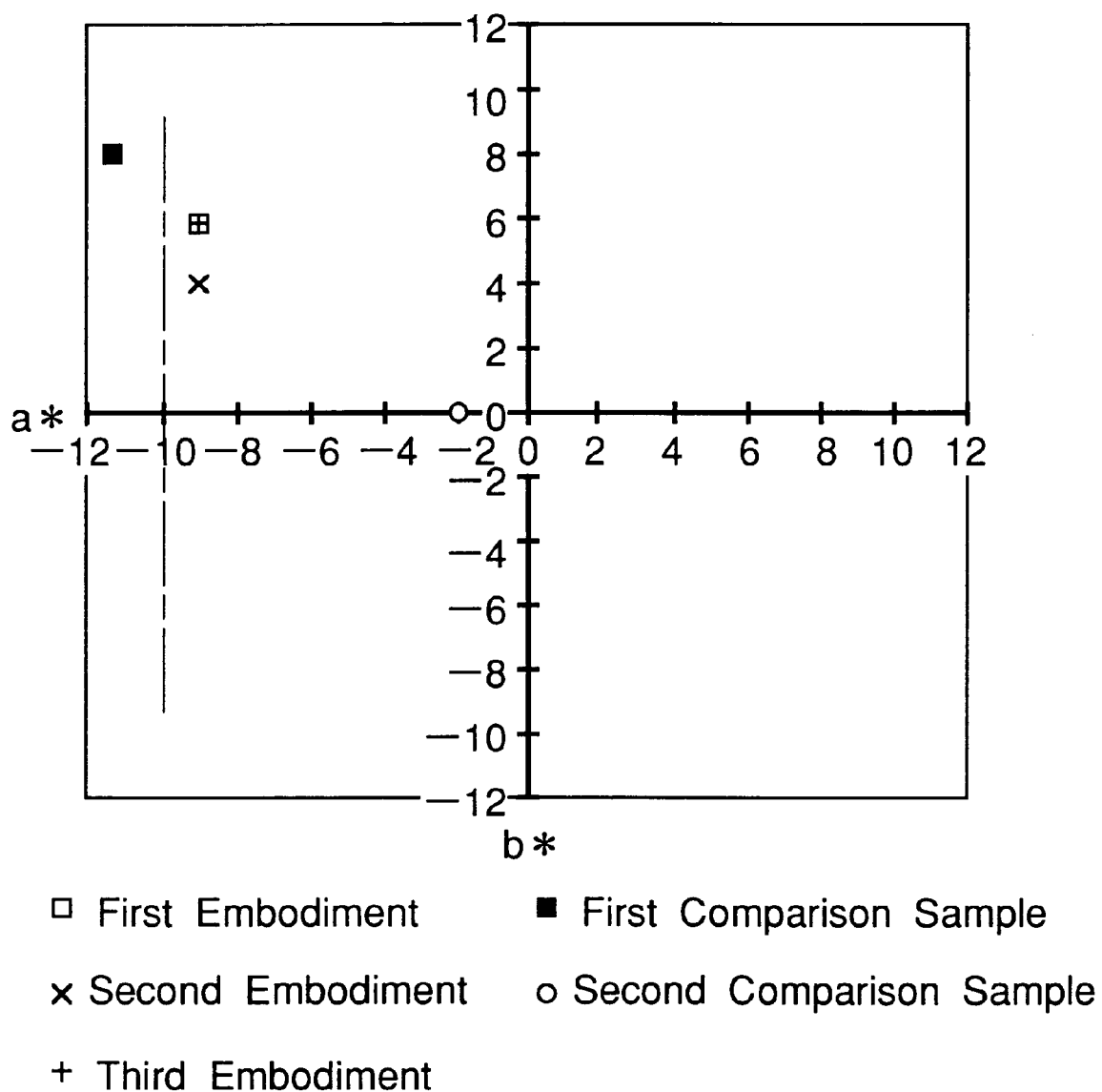
FIG. 11 is a graph showing the chroma of the reflection type monochrome liquid crystal display devices and the comparison samples.

The optical characteristics of the reflection type monochrome liquid crystal display device of the first through third embodiments and the first and second comparison samples are shown in FIG. 10. The chroma ($a^*$, $b^*$) is shown in FIG. 11.

In FIG. 10, the first comparison sample is a reflection type monochrome liquid crystal display device that has conventionally been used, and its optical characteristics are $L^*=53$, $a^*=-11$, $b^*=8$, $W^*=51$ and $Co=14$.

The second comparison sample polarizes incident light into a reflected component and a transmitted component by the upper polarizing plate and the lower polarizing plate. Therefore, the brightness $L^*=62$, meaning that the brightness is increased by the reflected component as compared with the first comparison sample. Furthermore, the achromatic DBEF in which $a^*$ #1 and $b^*$ #1 as shown in FIG. 6 is used for the upper polarizing plate and the lower polarizing plate, and therefore, the chroma has the values of $a^*=-2$ and $b^*=0$ to be made achromatic. The whiteness $W^*=62$, which is higher than $W^*=51$ of the first comparison sample. However, as described above, the contrast is significantly reduced to $Co=3$ as compared with that of the first comparison sample due to the fact that the reflected light coming from the lower polarizing plates is reflected on the upper polarizing plate, meaning that the value is not on the practical level.

In the case of the reflection type monochrome liquid crystal display device of the first embodiment, the value $L^*$ representing the brightness is reduced to $L^*=58$ as compared with that of the second comparison sample due to the use of the polarizing plate that polarizes the incident light into the absorbed component and the transmitted component as the lower polarizing plate 6. However, the value is higher than $L^*=53$ of the first comparison sample that is the conventionally used reflection type monochrome liquid crystal display device, meaning that the value is on the practical level. Furthermore, by using the polarizing plate that polarizes the incident light into the absorbed component and the transmitted component for the lower polarizing plate 6, the reduction in contrast attributed to the fact that the reflected light coming from the lower polarizing plate 6 is reflected on the upper polarizing plate 10 can be suppressed, when the Co value is improved from $Co=3$ of the second comparison sample to $Co=6$.

In addition to it, the values of $a^*$ and $b^*$ representing the chroma are $a^*=9$ and $b^*=6$, respectively, which are more improved than $a^*=-11$ and $b^*=8$ of the first comparison sample. Furthermore, the value of $W^*$ representing the whiteness is improved from $W^*=51$ of the first comparison sample to $W^*=57$. Therefore, the achievement of the paper-white appearance was proved.

The paper-white appearance can be evaluated as being achieved if $a^*<^*10^*$ and $b^*<^*10^*$.

In the case of the reflection type monochrome liquid crystal display device of the second embodiment, the directional silver reflecting plate is used as the reflecting plate 27. Therefore, a large amount of light can be collected in the direction of visual angle, by which the brightness is increased. This fact was proved from the fact that the $L^*$ value representing the brightness was improved from L*=58 of the first embodiment to L*=60. Furthermore, by the improvement of the brightness, the contrast is improved from Co=6 of the first embodiment to Co=8.

In the case of the reflection type monochrome liquid crystal display device of the third embodiment, the image projection due to the mirror surface reflection of light on the upper polarizing plate 50 is prevented by forming the light diffusing plate 51 on the upper polarizing plate 50, thereby improving the brightness and contrast. The improvement of the brightness and contrast was proved by the fact that the L* value was improved from L*=60 of the second embodiment to L*=61 and the Co value was improved from Co=8 of the second embodiment to Co=9. Furthermore, the value of W* is 61 being approximately identical to the value of the second comparison sample.

The aforementioned embodiments have been described on the basis of the examples of the reflection type monochrome liquid crystal display devices having the reflecting plates 7, 27 and 47. However, the present invention can also be applied to a semi-transmission type liquid crystal display device and a transmission type liquid crystal display device. The present invention can also be applied to a liquid crystal display device for color display use.

The invention being thus described, it will be obvious that the same maybe varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device having a liquid crystal layer and a pair of polarizing layers between which the liquid crystal layer is interposed, wherein
   one polarizing layer of the pair of polarizing layers, located on an observer side, is a polarizing layer which separates an incident light into a reflected light and a transmitted light, and
   the other polarizing layer of the pair of polarizing layers is a polarizing layer which transmits part of the incident light and absorbs the remaining part.

2. A liquid crystal display device as claimed in claim 1, wherein
   the one polarizing layer is a polarizing layer on which the reflected light has a roughly flat spectral characteristic.

3. A liquid crystal display device as claimed in claim 1, wherein
   the one polarizing layer is a polarizing layer
   in which chromaticness indices a* and b* in a CIELAB space have values expressed by a* #1 and b* #1 and
   the transmitted light has a roughly flat spectral characteristic.

4. A liquid crystal display device as claimed in claim 1, wherein
   the one polarizing layer separates the incident light into a linearly polarized reflected light and a linearly polarized transmitted light.

5. A liquid crystal display device as claimed in claim 1, wherein
   the other polarizing layer is a dichroic polarizing plate.

6. A liquid crystal display device as claimed in claim 1, wherein
   a light diffusing layer is laminated on the observer side of the one polarizing layer.

7. A liquid crystal display device as claimed in claim 1, wherein
   a light reflecting layer is provided on a side opposite to the observer side of the other polarizing layer.

8. A liquid crystal display device as claimed in claim 7, wherein
   the light reflecting layer has a directivity in a direction in which light is reflected.

9. A liquid crystal display device as claimed in claim 1, wherein
   the one polarizing layer has no right-side up with regard to a transmitted light characteristic and a reflected light characteristic.

* * * * *